(12) United States Patent
Oliveti

(10) Patent No.: US 6,760,519 B2
(45) Date of Patent: Jul. 6, 2004

(54) OPTICAL DEVICE FOR COMPENSATING CHROMATIC DISPERSION

(75) Inventor: Guido Oliveti, Milan (IT)

(73) Assignee: Corning Incorporated, Corning, NY (US)

(*) Notice: Subject to any disclaimer, the term of this patent is extended or adjusted under 35 U.S.C. 154(b) by 12 days.

(21) Appl. No.: 10/184,711

(22) Filed: Jun. 27, 2002

(65) Prior Publication Data

US 2003/0048990 A1 Mar. 13, 2003

Related U.S. Application Data

(60) Provisional application No. 60/309,795, filed on Aug. 6, 2001.

(30) Foreign Application Priority Data

Jun. 28, 2001 (EP) .............................. 01830435

(51) Int. Cl.[7] .............................. G02B 6/34; H04J 14/02
(52) U.S. Cl. .......................................... 385/37; 398/81
(58) Field of Search ..................... 385/37, 14, 129–131; 398/81

(56) References Cited

U.S. PATENT DOCUMENTS

| 4,953,939 | A | | 9/1990 | Epworth | |
| 5,982,963 | A | * | 11/1999 | Feng et al. | 385/37 |
| 6,246,814 | B1 | * | 6/2001 | Park | 385/37 |
| 6,370,300 | B1 | * | 4/2002 | Eggleton et al. | 385/37 |
| 6,411,746 | B1 | * | 6/2002 | Chamberlain et al. | 385/2 |
| 2003/0072531 | A1 | * | 4/2003 | Putnam et al. | 385/37 |
| 2003/0142911 | A1 | * | 7/2003 | Postolek et al. | 385/37 |

FOREIGN PATENT DOCUMENTS

| WO | WO 97/26581 | 7/1997 |
| WO | WO9731289 | 8/1997 |

OTHER PUBLICATIONS

"Dispersion cancellation using linearly chirped Bragg grating filters in optical waveguides", Optic Letters, vol. 12, No. 10, pp. 847–849, Francois Ouellette.

"Dual on–fiber thin–film heaters for fiber gratings with independently adjustable chirp and wavelength", Optics Letters, vol. 24, No. 19, Oct. 1, 1999, John A Rogers et al.

* cited by examiner

*Primary Examiner*—Edward J. Glick
*Assistant Examiner*—Thomas R Artman
(74) *Attorney, Agent, or Firm*—Mary Y. Redman

(57) ABSTRACT

Optical device for compensating chromatic dispersion, comprising a variable-pitch Bragg grating having a predetermined reflection wavelength and a predetermined chirping factor, and a substrate, in which the said grating is fitted into a central longitudinal groove, and which can be elongated in such a way as to cause a change in the said predetermined chirping factor.

2 Claims, 3 Drawing Sheets

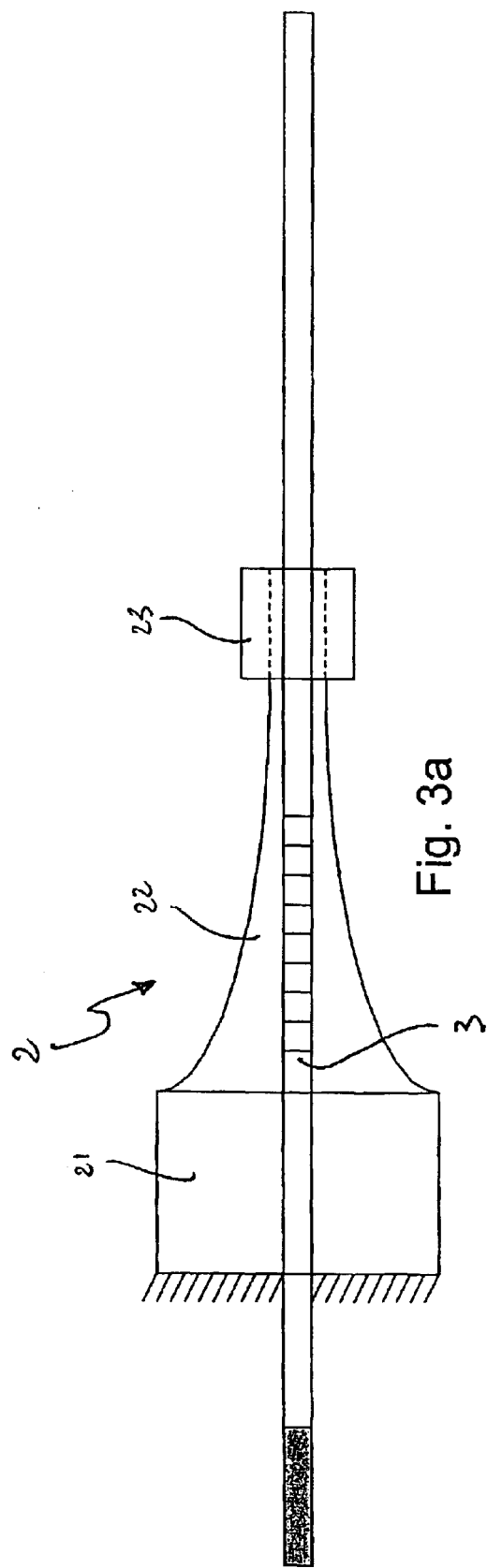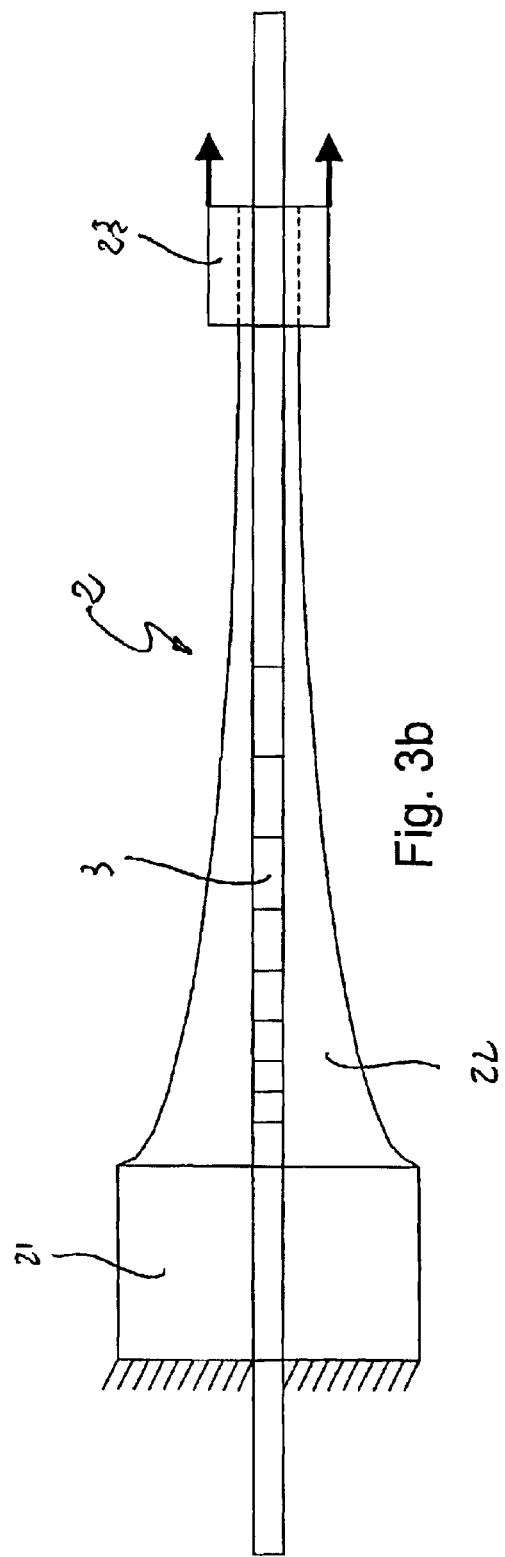

OPTICAL DEVICE FOR COMPENSATING CHROMATIC DISPERSION

Figure 4:
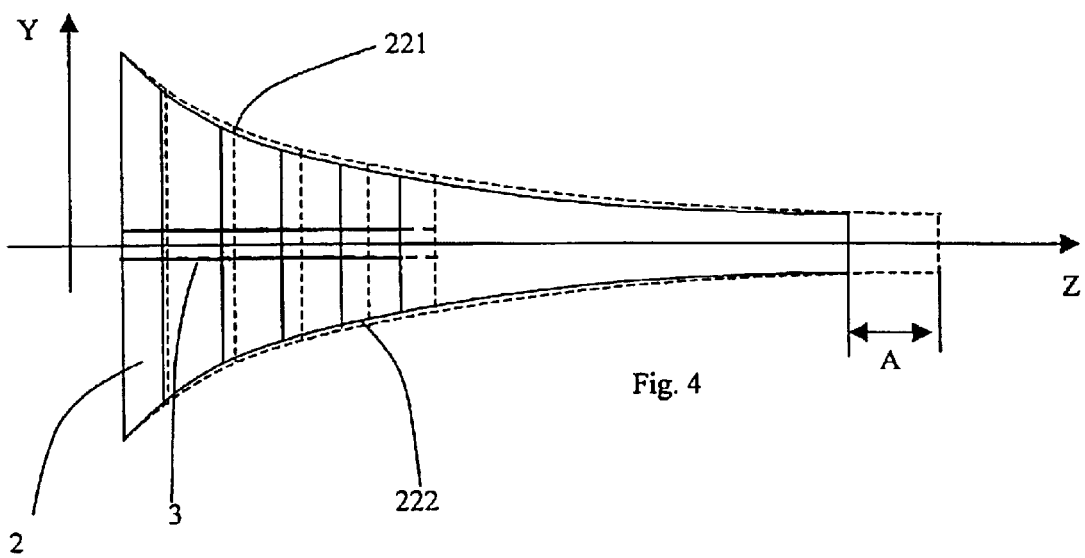

This application claims the benefit of provisional application No. 60/309,795, filed Aug. 6, 2001.

BACKGROUND OF THE INVENTION

1. Field of the Invention

The present invention relates to an optical device for compensating chromatic dispersion in optical telecommunications systems.

2. Technical Background

The optical fibers used for transmitting signals in optical telecommunications systems show a phenomenon called chromatic dispersion, due to the combination of the characteristics of the constituent material of these fibers and the characteristics of their refractive index profile; this chromatic dispersion is variable with the wavelength of the signals transmitted and is canceled at a certain value of wavelength.

This phenomenon of chromatic dispersion essentially consists of a widening of the duration of the pulses forming the signal during transit through the fiber, this widening being due to the fact that the different chromatic components of each pulse, each characterized by its own wavelength, travel at different velocities in the fiber.

As a result of this widening, pulses which follow each other in time and are quite distinct from each other at the moment of transmission can become partially superimposed on reception, after traveling along the fiber, up to the point where they are no longer distinguishable as separate entities, causing an error in reception.

Chromatic dispersion can be reduced by using, in place of the ordinary SI (step index) fibers, which have a zero dispersion at a wavelength in the region of 1300 nm, transmission fibers in which the chromatic dispersion cancellation point is shifted, these being known as DS (dispersion shifted); the optical characteristics of these fibers are designed in such a way that the chromatic dispersion cancellation point is brought to a wavelength in the region between 1500 and 1600 nm, which is commonly used for telecommunications.

Fibers of this kind are defined in ITU-T Recommendation G.653 of March 1993, which specifies that the chromatic dispersion of the fiber should be canceled nominally at a wavelength $\lambda_0$ of 1550 nm, with a tolerance of 50 nm with respect to this value.

DS fibers are described, for example, in U.S. Pat. Nos. 4,715,679, 4,822,399, and 4,755,022.

Even when transmission fibers of the DS type are used, however, the signals will inevitably undergo a residual chromatic dispersion when propagated through long cable runs, of the order of hundreds of kilometers for example, because of the variations of the chromatic dispersion cancellation wavelength about the nominal value over the length of the fiber.

In the case of optical transmission of the wavelength division multiplexing (or WDM) type, in which signals at different wavelengths are transmitted simultaneously along the line, a positive or negative chromatic dispersion is produced for signals at wavelengths above or below the chromatic dispersion cancellation wavelength.

In-fiber Bragg gratings are formed by an alternation of areas having a high refractive index with areas having a low refractive index. The distance between these areas is called the pitch of the grating. The pitch of the grating determines which wavelengths are reflected and which are transmitted. Patent application WO9636895 describes a method for writing this type of grating in an optical fiber. To compensate the chromatic dispersion, a proposal was made in an article by F. Ouellette, published in *Optics Letters*, Vol. 12, No. 10, pp. 847–849, October 1987, and in U.S. Pat. No. 4,953,939, in the name of Epworth, of Apr. 9, 1990, to use an optical fiber with distributed Bragg reflection with a variable-pitch grating (chirped grating).

The article "Dual on fiber thin-film heaters for fiber gratings with independently adjustable chirp and wavelength", published in *Optics Letters*, Vol. 24, No. 19, Oct. 1, 1999, describes a chirped in-fiber Bragg grating on whose external surface there is a first metallic coating on which a second metallic coating is superimposed. There is an insulating layer between the two metallic coatings. An electric current is applied to each of the metallic coatings. The Bragg wavelength and the chirping factor can be controlled by controlling the intensity of these currents.

Patent application WO9726581 describes a Bragg grating fitted on a dimorphous element. In response to an electrical control signal, this dimorphous element bends in such a way as to modify the spectral response of the Bragg grating. Such a Bragg grating fitted on such a dimorphous element is used as a chromatic dispersion compensator.

SUMMARY OF THE INVENTION

The applicant has observed that, in this patent application, the torsion of the dimorphous element causes a modification of the pitch of the grating of the linear type; in other words, as the dimorphous element is bent, the pitch at any point of the grating is modified by the same amount.

For wavelength division multiplexing, or WDM, transmission, a plurality of mutually independent transmission signals have to be sent along the same line, consisting of optical fibers, by means of multiplexing in the optical wavelength domain; the transmitted signals can be either digital or analog, and are distinguished from each other in that each of them has a specific wavelength, separate from that of the other signals.

To implement this WDM transmission, specific wavelengths of predetermined amplitude, termed "channels" in the following text, have to be assigned to each of the signals at different wavelengths. These channels, each identified in the following text by a wavelength value, called the central channel wavelength, have a certain spectral amplitude around the central wavelength value, which depends, in particular, on the characteristics of the signal source laser and on the modulation imparted to this to associate a data element with the signal. Typical values of spectral amplitude of the signal emitted by a laser, in the absence of modulation, are in the region of 10 MHz; in the presence of external modulation, at 2.5 Gbit/s for example, the spectral amplitude is approximately 5 GHz.

In order to transmit signals in a large number of channels, making use of what is known as the third transmission window of silica fibers and of the bandwidth of optical amplifiers (for example, from 1525 to 1565 nm, or from 1540 to 1620 nm, or from 1525 to 1620 nm), the wavelength separation between the channels is conveniently of the order of nanometers or fractions of nanometers.

For correct reception of these transmission signals, it is necessary to provide a separation between the signals, for directing them to the corresponding users. Furthermore, during their travel along the line the signals can undergo alterations due to the said phenomenon of chromatic dispersion; moreover, signals having different wavelengths from each other can undergo different alterations from each other, and consequently some channels have a better transmission quality than others following demultiplexing.

The applicant has tackled the problem of compensating the effects of chromatic dispersion in multiple-wavelength telecommunications systems, in other words in systems in which signals at different wavelengths are transmitted simultaneously along the line (WDM). In these systems, the chromatic dispersion is different for each channel, and therefore, in order to compensate the effects of this phenomenon accurately, it is advantageous to use a dispersion compensator for each channel of the multiple-wavelength signal after the WDM signal has been demultiplexed. The applicant has considered the problem of making a component capable of compensating the chromatic dispersion in a multiple-wavelength system.

The applicant has found that it is possible to compensate the chromatic dispersion of each channel of a multiple-wavelength signal by forming a variable-pitch Bragg grating and modifying the said variable pitch appropriately according to the channel, by means of a distributed elongation of the said grating. In particular, the applicant has found that, by fixing the said grating, made in an optical fiber for example, to a supporting substrate, which undergoes a non-linear elongation effect, it is possible to compensate the effects of chromatic dispersion on a channel of the said WDM signal. The form of the said substrate is such that it undergoes a non-linear elongation, with a consequent equivalent elongation of the grating. For each channel of the multiple-wavelength signal an elongation is predetermined, and is dependent on the central wavelength of the channel.

In one of its aspects, the present invention relates to an optical device for compensating chromatic dispersion, comprising a variable-pitch Bragg grating having a predetermined reflection wavelength and a predetermined chirping factor, and a substrate, on which this grating is integrally mounted, and which can be elongated in such a way as to cause a change in the said predetermined chirping factor.

In particular, the said grating is fitted into a longitudinal central groove of the said substrate. Preferably, the said substrate comprises a central portion essentially of truncated conical shape, having the inclined sides curved according to a predetermined profile of curvature.

Preferably, the said profile of curvature is a hyperbolic profile.

Preferably, the said Bragg grating is formed in an optical fiber.

The said optical device additionally comprises a traction device for elongating the said substrate. In particular, the said substrate comprises a first portion and a second portion in which are formed holes which can interact with the said traction device for elongating the said substrate.

Figure 1:
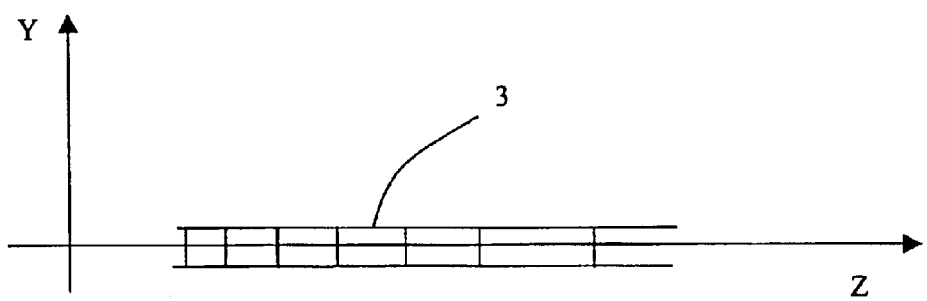
Figure 2:
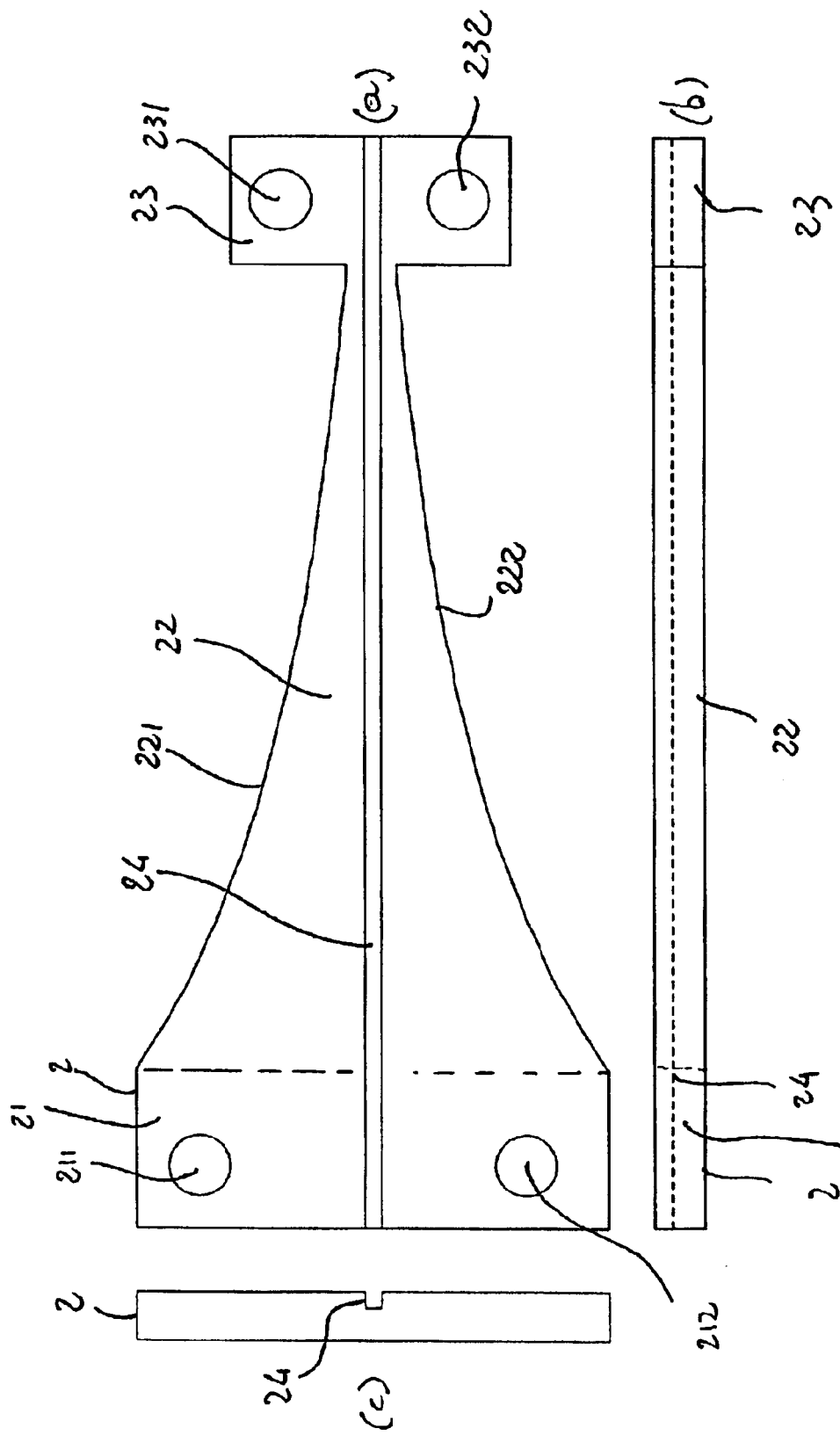

Further characteristics and advantages of the present invention are disclosed in greater detail by the following description, with reference to the attached drawings, which are supplied solely for explanatory purposes and without any restrictive intent, and which show the following:

BRIEF DESCRIPTION OF THE DRAWINGS in FIG. 1, a Bragg grating formed in an optical fiber, showing a system of Cartesian axes (where z is the horizontal axis and y is the vertical axis);

in FIG. 2a, a plan view of a supporting substrate for the device for compensating the effects of chromatic dispersion according to the present invention;

in FIG. 2b, a front view of the substrate of FIG. 2a;

in FIG. 2c, a side view of the substrate of FIG. 2a;

in FIG. 3a, a device for compensating the effects of chromatic dispersion, in a first state of elongation;

in FIG. 3b, a device for compensating the effects of chromatic dispersion, in a second state of elongation;

in FIG. 4, a plan view of a substrate, showing a system of Cartesian axes (where z is the horizontal axis and y is the vertical axis).

DETAILED DESCRIPTION OF THE PREFERRED EMBODIMENTS

FIG. 1 shows a Bragg grating 3. In this grating, the Bragg wavelength λ, in other words the reflected wavelength, is given by the formula:

$$\lambda = 2 n_{eff} \Lambda \quad (1)$$

where $n_{eff}$ is the effective refractive index of the grating, which depends on the material from which the grating is made and on its geometry, and $\Lambda$ is the pitch of the grating.

If the grating is variable-pitch grating, the pitch $\Lambda$ can be expressed as:

$$\Lambda = +\alpha z \quad (2)$$

where $\alpha$ is called the chirping factor and z indicates the position along the grating.

From (1) and (2), we find that $$\lambda = 2 n_{eff} \Lambda_o + 2 n_{eff} \alpha z.$$

The light reflected at position z accumulates within a time delay τ:

$$\tau = 2 n_{eff} z / c \quad (3)$$

where c is the velocity of light.

By finding $n_{eff}$ from (2) and substituting it in (3), we obtain:

$$\tau = z \lambda / (c \Lambda_o + \alpha c z) \quad (4)$$

The chromatic dispersion is defined as the derivative of the delay time with respect to the wavelength, and assuming that $\Lambda_0 = 0$, we obtain:

$$D = d\tau / d\lambda = 1 / \alpha c \quad (5)$$

The applicant has noted that, since α is the chirping factor which can compensate the effects of the dispersion at a given wavelength λ, it is possible to compensate the effects of the dispersion at a wavelength λ by varying the chirping factor α.

The applicant has found that it is possible, for example, to modify the chirping factor in this way by elongating the grating in a differentiated way. In particular, the areas with a high refractive index must be moved away from each other in a progressive way. In particular, there is a ratio of inverse proportionality between the chirping factor and the chromatic dispersion.

FIGS. 2a to 2c show a device for compensating the effects of chromatic dispersion according to the present invention, comprising a substrate 2 which is preferably made in a material having sufficient elasticity to withstand an elongation of approximately ¹⁄₁₀ of its length. Examples of suitable materials for the substrate are metals, for example aluminium.

The said substrate is preferably of elongate shape overall, comprising a first portion 21, preferably of rectangular shape, and a second portion 23, also preferably of rectangular shape. Between the said first and the said second portion, the substrate comprises a central portion 22, essentially of truncated conical shape, having its inclined sides 221 and 222 curved according to a predetermined profile of curvature. The said profile is preferably a hyperbolic profile. This central portion has its two rectilinear sides connected to the said first portion and to the said second portion of the substrate.

The substrate also comprises a longitudinal groove 24, located in a central position and preferably passing through all three portions of the substrate. A variable-pitch Bragg grating (not shown in FIG. 2) is positioned in the said central groove. Preferably, the whole length of this grating is fixed within the groove, in such a way that both the substrate and the component undergo the same elongation.

A pair of holes 211 and 212 is formed in the said first portion 21, and a pair of additional holes 231 and 232 is formed in the said second portion 23, these holes being used for fixing the substrate to means for elongating the said substrate. These means can equally well be manual elongation means, for example a lever or a knob, or automatic elongation means, for example a miniature electric motor.

FIGS. 3a and 3b show the substrate of FIGS. 2a–2c, in which a Bragg grating 3 is located within the longitudinal groove.

This grating is mounted integrally within the groove, by means of an epoxy adhesive for example; in general, the component can be fixed within the groove in any equivalent way in order to make the grating integral with the substrate and not to prevent the elongation of both the substrate and the grating. An example of an adhesive of this type is an epoxy resin, Epo-Tek H72, made by Epoxy Technology, Inc.

FIG. 4 shows schematically a substrate 2 with a grating 3 fitted into it, in a first state of elongation, on which has been superimposed the same substrate elongated through a predetermined length (indicated by A in FIG. 4). The areas of high reflection of the grating fitted into this support are shown by vertical lines, which for ease of reference have been extended over the whole width of the support. The figure shows that the areas of high reflection move away from each other progressively in a non-linear way. It should be noted that, for ease of reference, the grating in the first state of elongation is shown with a fixed pitch. Following the elongation, the grating becomes a chirped grating. In fact, a chirped grating which is elongated according to the method of the present invention increases its chirping factor.

In a DWDM (dense wavelength division multiplexing) multiple-wavelength optical telecommunications system, the grid of wavelengths used by the transmitted channels is preferably 25–50 GHz, for transmission speeds of 10–40 Gbit/s (grid according to ITU-T recommendations). The transmitted channels can be, for example, 128 in number, spaced apart from each other by approximately 0.4 nm (in a total band between 1530 nm and 1605 nm); in this case, in order to compensate a chromatic dispersion of about 500 ps/nm, for example, the grating requires a chirping factor $\alpha=6.5\times10^{-9}$ approximately. In order to compensate the dispersion over the whole grid of wavelengths (with a variation of dispersion of approximately ±200 ps, for example), the chirping factor must be in the range from $4.76\times10^{-9}$ to $1.1\times10^{-8}$. For the lowest value of $\alpha$, we find from the formula $\Delta\lambda=n_{\mathit{eff}}\Lambda=0.4$ nm that $\Lambda\cong2.86$ cm.

In this example, therefore, it is possible to use a grating having a length of approximately 3 cm, with an initial chirping factor of $4.76\times10^{-9}$ and a Bragg wavelength centered on the wavelength of the channel with the lowest wavelength (1530 nm). The elongation of the substrate and of the grating must be such that the chirping factor is raised to $1.1\times10^{-8}$ to compensate the dispersion of the channel with the longest wavelength.

The device for compensating chromatic dispersion according to the present invention is advantageously applicable to multiple-wavelength telecommunications system in which, at the end of the line, the multiple-wavelength signal is broken down by a demultiplexer into its individual components, and in which each component (channel) is compensated individually. In fact, the device according to the present invention permits an adjustment of the chirping factor in such a way that it can be applied to any channel. The device according to the present invention can be produced easily in the initial (non-elongated) state in a plurality of individual devices. Each individual device can subsequently be adjusted to the channel wavelength of the system which is to be compensated. This reduces the production costs of the device, since all the individual devices for a single telecommunications system can be serially produced.

What is claimed is:

1. An optical device for compensating chromatic dispersion, comprising:
    a variable-pitch Bragg grating having a predetermined reflection wavelength and a predetermined chirping factor, characterized in that it comprises:
        a substrate on which this grating is integrally mounted, and which can be elongated in such a way as to cause a change in said predetermined chirping factor, in which said substrate comprises a central portion essentially of truncated conical shape, having the inclined sides curved according to a predetermined profile of curvature.

2. An optical device according to claim 1, in which the said profile of curvature is a hyperbolic profile.

\* \* \* \* \*